Nov. 28, 1961    E. H. SIEGLER, JR    3,010,358
RADIATION MICROSAMPLING APPARATUS
Filed Feb. 19, 1959
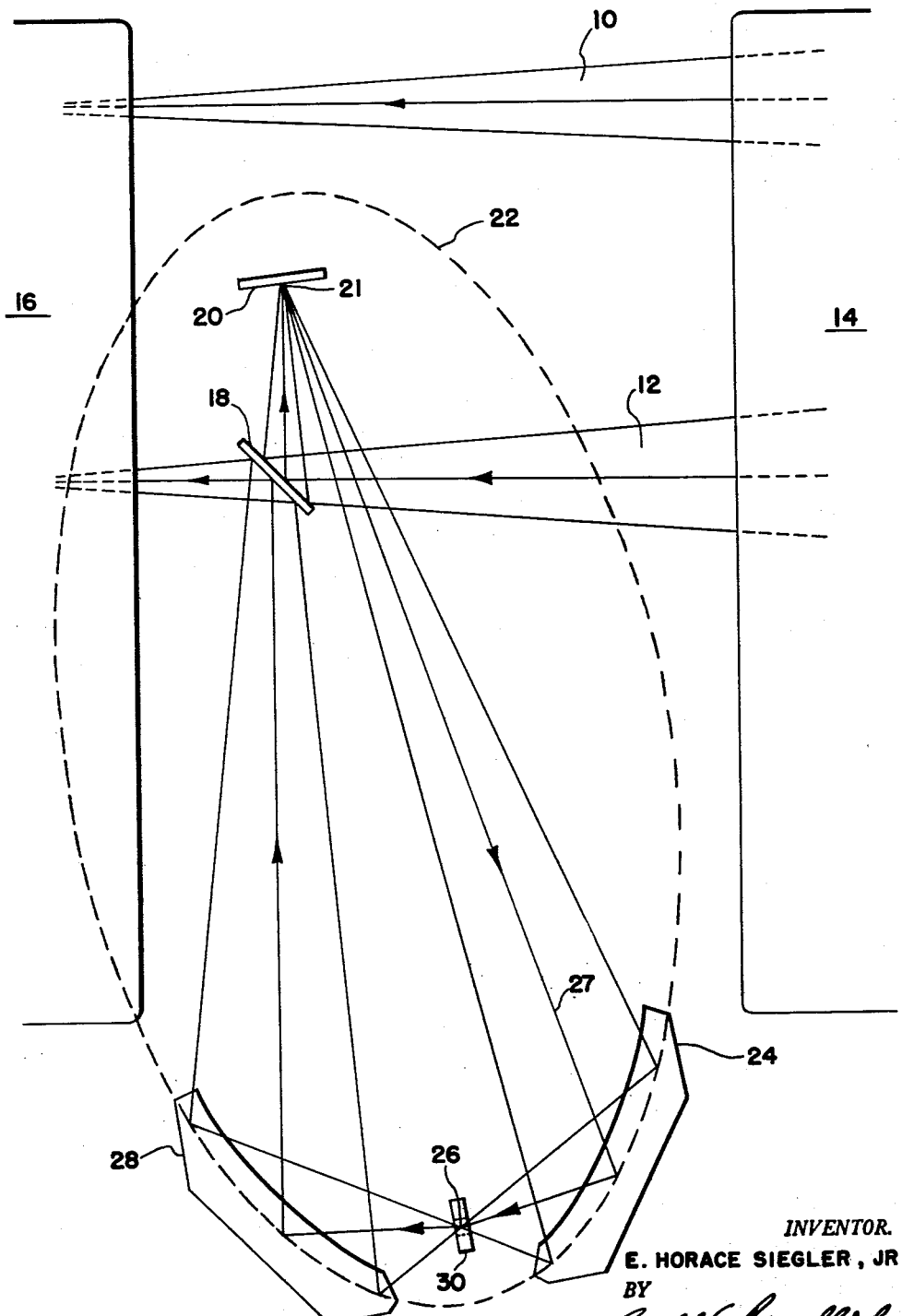
INVENTOR.
E. HORACE SIEGLER, JR.
BY
ATTORNEY United States Patent Office 3,010,358
Patented Nov. 28, 1961

3,010,358
RADIATION MICROSAMPLING APPARATUS
Edouard H. Siegler, Jr., Darien, Conn., assignor to The Perkin-Elmer Corporation, New York, N.Y., a corporation of Connecticut
Filed Feb. 19, 1959, Ser. No. 794,381
3 Claims. (Cl. 88—14)

This invention relates to an improved radiation comparison system and more particularly to improved apparatus for the analysis of microsamples.

Radiation comparison systems are widely used in many fields of chemical analysis and have demonstrated their usefulness in the identification of compounds of many types. Infrared analysis particularly is widely employed to measure the absorption characteristics of the materials under study. Both single beam and double beam radiation comparison systems are employed for such analysis. A common type of double beam analyzer is disclosed in United States Patent 2,817,769, entitled "Radiation Comparison Systems."

Although infrared spectrophotometry has achieved a high state of usefulness there are still certain limitations inherent in instruments presently available. One of the chief limitations is the inability of such apparatus to accurately analyze extremely small samples. This shortcoming raises particular difficulties in fields such as biochemistry where it is often impossible to obtain samples in quantities greater than fractions of a microgram. For example, the circulating adrenal steroid hydrocortisone is present in human blood in concentrations of about 5 $\mu$gm. per 100 ml. A 1 $\mu$gm. sample is the largest that can reasonably be obtained from a donor. Many attempts have been made by those skilled in the art to provide apparatus capable of analyzing such samples. It has been suggested, for example, that a pair of lenses be inserted into the sample beam of a radiation comparison system. The sample would then be placed at the focus of the beam between the lenses. This solution has been only partially successful and difficulties occur from fogging of the lenses, reflection losses of radiant energy, and chromatic aberration. Furthermore, it is difficult to concentrate the radiation beam to as small an area as desired. Finally, the sample area is located between and close to at least one of a pair of lenses and is, therefore, physically difficult to reach.

Another system sometimes employed comprises a microscope assembly inserted into the sample beam. In this construction the optical elements, both lenses and mirrors, are situated along a common axis and the sample is located on the same axis at a point physically between the optical elements. While this construction has some advantages over the dual lens system previously described, it remains unsatisfactory for several reasons. Because of the location of the elements along a common axis, a shadow effect is inherent in this system which tends to lower the efficiency of radiant energy transmission. Furthermore, this system is characterized by optical and mechanical complexity.

It is, therefore, a primary object of the present invention to provide an improved microsampling apparatus for use with a radiation comparison system. Other objects are to provide such apparatus having improved accessibility of sample positioning means, relatively few optical elements, and relatively high radiation transmission efficiency. The above objects are attained by providing, in a radiation comparison system having at least one sample beam, the improvement comprising first and second off-axis reflector means. Each of the reflector means is a portion of an ellipsoidal surface and is positioned in intercepting relationship to a line passing through a first focal point of one of the reflector means. Means are provided to transmit the sample beam from a second focal point of one of the off-axis reflector means to its surface. Other means are provided to receive the sample beam as it is reflected from the other of the off-axis reflectors and to transmit the beam to the radiation comparison system. Additional means are provided for supporting a sample at the first focal point.

The construction of an illustrative apparatus falling within the limits of the inventive concept will be apparent from the following description, the appended claims, and the single figure of the attached drawing which illustrates an embodiment of the invention adapted for use with a double beam radiation comparison system.

As is well known to those skilled in the optical art, an ellipsoid has certain inherent features peculiar to that configuration. One of its better known qualities is that a ray issuing from one focal point and striking the surface of the ellipsoid will be reflected through the other focal point. This feature has been utilized in some previous apparatus wherein ellipsoidal mirrors were provided along the longitudinal axis of the ellipsoid. This type of construction has been noted above and has the disadvantages of shadow effect and poor efficiency. Furthermore, it is not adapted to be used except at the end of a radiant energy beam. The present invention provides a novel and effective improvement in radiation comparison system by providing two off-axis ellipsoidal mirrors, thereby making it possible to achieve high degrees of magnification and transmission efficiency while at the same time maintaining adequate room for the positioning of a sample. These features will be more apparent by reference to the drawing wherein the apparatus of the invention is illustrated in combination with a double beam radiation comparison system having a reference beam 10 and a sample beam 12 radiating from a source 14 to the monochromator housing 16. A first plane mirror 18 is provided in the path of the sample beam to reflect the sample beam to a second plane mirror 20 positioned at the focal point 21 of an ellipsoidal surface 22. Plane mirror 20 is adjusted so that the sample beam is further reflected to an off-axis ellipsoidal mirror 24 comprising a portion of the surface of ellipsoid 22. Due to the inherent properties of an ellipsoidal surface, the rays reflected from off-axis ellipsoidal mirror 24 are concentrated at focal point 26 of ellipsoidal surface 22 and continue on to second off-axis ellipsoidal mirror 28. Mirror 28 transmits the radiant energy toward focal point 21 of the ellipsoidal surface. This radiation is intercepted by a second reflecting surface of plane mirror 18 which reflects the radiation back into the normal path of sample beam 12 and into monochromator housing 16. Off-axis ellipsoidal mirrors 24 and 28 are so designed as to provide any desired magnification ratio. The ratio of the distances between focal point 21 and reflector 24 and between reflector 24 and focal point 26 establishes the magnification ratio. The sample to be analyzed is placed at focal point 26 and held in a sample support 30 where it is irradiated by the greatly concentrated sample beam 12.

As an example of the apparatus of the invention two 6:1 off-axis ellipsoidal mirrors were utilized in the manner indicated by the figure as a microsampling apparatus in a standard infrared spectrophotometer. The distance between the focal points of the ellipsoidal surface was 20 centimeters and the off-axis ellipsoidal mirrors were symmetrically positioned with their midpoints approximately 3.4 centimeters from focal point 26. The distance between the plane mirrors 18 and 20 along the central ray approximated 4.3 centimeters. The distance along the central ray from plane mirror 20 to the surface of off-axis ellipsoidal mirror 24 was 20.4 centimeters, 6 times the distance from the surface of mirror 24 to the microsampling area 26. With this arrangement a 1/6 reduction in size of the source image appearing at the microsampling area was obtained. Utilizing apparatus of the type described it has been found possible to obtain excellent spectra utilizing as little as 1/10 microgram of sample material contained in a potassium bromide pellet 0.5 mm. in diameter. It will be noted from the drawing that the central ray 27 of the beam incident on ellipsoidal mirror 24 is not the central ray of the beam after reflection by the mirror. This is true because the magnification produced by mirror 24 varies along its surface and is truly 6 to 1 only for the central bundle of rays. It will also be noted that by proper selection of optical elements, the microsampling unit may be inserted into the sample beam of a standard instrument without disturbing the configuration of sample beam 12 prior to its entry into housing 16.

It will be apparent to those skilled in the art that a number of variations of this invention may be employed. Off-axis ellipsoidal mirrors of any magnification ratio may be employed, for example, and the mirrors may be placed at any convenient locations upon an ellipsoidal surface compatible with the magnification desired. It is only necessary that the mirrors be positioned so that the second reflecting surface has incident upon it the radiation transmitted by the first ellipsoidal mirror through a focal point of the ellipsoid. It is not even necessary that the ellipsoidal mirrors be sections of the same ellipsoid. For example, the mirrors may be portions of two different but intercepting ellipsoids having a common focal point or of two ellipsoids having both focal points in common but of different eccentricities. While a single plane mirror 18 having dual reflecting surfaces has been employed in the illustrated embodiment, it will be obvious that two mirrors may also be employed.

By employing apparatus of the type described in a standard radiation comparison system, an additional path length will probably be introduced into the sampling beam. If this additional path length creates analytical difficulties, it may be compensated for by the introduction of an additional path length in the reference beam or by other means obvious to those skilled in the art.

The invention described herein is a simple, reliable, and accurate microsampling apparatus widely applicable for use in radiation comparison systems of both the single beam and double beam types. The advantages inherent in this invention will be readily apparent to those skilled in the art of analytical measurement by the use of radiation comparison systems.

As used in the specification, the term "off-axis" as related to ellipsoidal reflectors refers to a reflector having as a reflecting surface a portion of an ellipsoidal surface not intercepted by the longitudinal axis of the surface.

I claim:

1. In a radiation comparison system having at least one sample beam the improvement which comprises first and second off-axis ellipsoidal reflector means, each of said reflector means comprising a portion of the surface of an ellipsoid and positioned in intercepting relationship to a line passing through a first common focal point; first radiation directing means positioned to direct said sample beam from a second focal point of said first reflector means to said first reflector means whereby the rays of said sample beam are reflected through said common focal point to said second off-axis ellipsoidal reflector means; second radiation directing means positioned to direct the sample beam from said second off-axis reflector means to said radiation comparison system; and means for supporting a sample substantially at said common focal point.

2. In a radiation comparison system having at least one sample beam the improvement which comprises first and second off-axis ellipsoidal reflector means having as reflecting surfaces thereof portions of the surface of an ellipsoid, each of said reflector means being positioned in intercepting relationship to a line passing through a first focal point of said ellipsoidal surface; first plane mirror means in intercepting relationship to said sample beam to reflect said sample beam to a second focal point of said ellipsoidal surface; second plane mirror means at said second focal point in reflecting relationship to said sample beam to transmit said sample beam to said first off-axis ellipsoidal reflector means whereby the rays of said sample beam are reflected through said first focal point to said second off-axis ellipsoidal reflector means; third plane mirror means in intercepting relationship to the reflected sample beam to transmit said beam to said radiation comparison system; and means for supporting a sample substantially at said first focal point.

3. The apparatus of claim 2 wherein the distance from the second focal point to the first off-axis ellipsoidal reflector surface is greater than the distance from said reflector surface to the first focal point.

References Cited in the file of this patent
UNITED STATES PATENTS

| | | |
|---|---|---|
| 1,897,219 | Schroter | Feb. 14, 1933 |
| 1,906,459 | Goldrei | May 2, 1933 |
| 2,149,735 | Henderson | Mar. 7, 1939 |
| 2,730,004 | Badger et al. | Jan. 10, 1956 |